United States Patent
Robles et al.

(10) Patent No.: US 10,862,974 B2
(45) Date of Patent: Dec. 8, 2020

(54) MULTI-USER, CROSS-BROWSER SIGNATURE PLATFORM

(71) Applicant: Wacom Co., Ltd., Kazo (JP)

(72) Inventors: Felix Robles, Frome (GB); Martin Holden, Melksham (GB)

(73) Assignee: Wacom Co., Ltd., Kazo (JP)

( * ) Notice: Subject to any disclaimer, the term of this patent is extended or adjusted under 35 U.S.C. 154(b) by 154 days.

(21) Appl. No.: 15/941,830

(22) Filed: Mar. 30, 2018

(65) Prior Publication Data

US 2018/0227370 A1 Aug. 9, 2018

Related U.S. Application Data

(63) Continuation of application No. PCT/JP2016/079824, filed on Oct. 6, 2016.
(Continued)

(51) Int. Cl.
*H04L 29/08* (2006.01)
*H04L 9/32* (2006.01)
(Continued)

(52) U.S. Cl.
CPC ............ *H04L 67/141* (2013.01); *G06F 13/00* (2013.01); *G06F 16/9566* (2019.01);
(Continued)

(58) Field of Classification Search
CPC . G06F 13/00; G06F 16/9566; G06Q 20/4014; H04L 67/141; H04L 9/3247;
(Continued)

(56) References Cited

U.S. PATENT DOCUMENTS 8,601,363 B2 12/2013 Cahill et al.
9,235,748 B2 1/2016 Mettyear
(Continued)

FOREIGN PATENT DOCUMENTS

JP 2009-015747 A 1/2009
WO 2006/069111 A2 6/2006

OTHER PUBLICATIONS

International Search Report dated Dec. 27, 2016, issued in corresponding International Application No. PCT/JP2016/079824, filed Oct. 6, 2016, 3 pages.
(Continued)

*Primary Examiner* — Abdulkaer M Alriyashi
(74) *Attorney, Agent, or Firm* — Christensen O'Connor Johnson Kindness PLLC

(57) ABSTRACT

A method executed by a local computing device communicatively coupled to a signature device includes launching a signature device control instance including a local web server. The control instance controls the signature device and receives signature data from the signature device, and listens to a localhost and a first port corresponding to a first URL. The method further includes retrieving, by a web browser executing on the local computing device, a web page from a remote server with a second URL. The web page includes a document indicating a context for a signature to be input by the signature device, and a cross-domain reference indicating the first URL. The method further includes, by the web browser, establishing a connection with the first port listened to by the control instance using the first URL; controlling the signature device; and receiving signature data from the signature device.

9 Claims, 11 Drawing Sheets

Related U.S. Application Data

(60) Provisional application No. 62/238,445, filed on Oct. 7, 2015.

(51) Int. Cl.
  *G06F 16/955* (2019.01)
  *G06Q 20/40* (2012.01)
  *G06F 13/00* (2006.01)
  G06K 9/00 (2006.01)
  G06K 9/22 (2006.01)
  H04L 29/06 (2006.01)

(52) U.S. Cl.
  CPC ....... *G06Q 20/4014* (2013.01); *H04L 9/3247* (2013.01); *H04L 9/3263* (2013.01); *G06K 9/00174* (2013.01); *G06K 9/222* (2013.01); *H04L 63/168* (2013.01)

(58) Field of Classification Search
  CPC . H04L 9/3263; H04L 63/168; G06K 9/00174; G06K 9/222
  See application file for complete search history.

(56) References Cited

U.S. PATENT DOCUMENTS

| | | | |
|---|---|---|---|
| 2002/0046403 A1 | 4/2002 | Kim et al. | |
| 2011/0016169 A1* | 1/2011 | Cahill | G06F 21/54 |
| | | | 709/203 |
| 2013/0269019 A1* | 10/2013 | Garmark | G06F 17/2247 |
| | | | 726/9 |
| 2013/0326012 A1 | 12/2013 | Hashimoto | |
| 2015/0186658 A1* | 7/2015 | Marien | H04L 9/006 |
| | | | 713/165 |
| 2015/0280921 A1* | 10/2015 | Geoffrey | H04L 9/0866 |
| | | | 713/176 |

OTHER PUBLICATIONS

Written Opinion of the International Searching Authority dated Dec. 27, 2016, issued in corresponding International Application No. PCT/JP2016/079824, filed Oct. 6, 2016, 5 pages.

* cited by examiner

MULTI-USER, CROSS-BROWSER SIGNATURE PLATFORM

CROSS-REFERENCES TO RELATED APPLICATIONS

This application is a continuation of International Application No. PCT/JP2016/079824, filed Oct. 6, 2016, which claims the benefit of U.S. Provisional Patent Application No. 62/238,445, filed Oct. 7, 2015, the disclosures of which are expressly incorporated by reference herein.

BACKGROUND

Electronic handwriting is increasingly important in a variety of contexts. As electronic handwriting has become more common, the ability to verify authenticity of electronic handwriting has also become more important. For example, electronic handwriting is now commonly used in place of pen and paper to obtain a credit card holder's affirmation of a credit card transaction. As another example, signature pads and tablets are used in banks, retail stores, and other locations to obtain signatures on legally binding documents. Typically, the functionality for capturing the necessary signatures is provided in the form of a dedicated software application running on a computer to which the signature device is connected or, for suitably configured devices, on the signature device itself.

In parallel, consumers are demanding access to more digital content and a wide variety of functionality over the Internet. In the past, web sites have sometimes required consumers to use particular web browsers with particular functionality to ensure proper function (e.g., an Internet Explorer® browser with ActiveX® functionality, provided by Microsoft Corporation). However, today's consumer demands seamless access. If a web site requires a particular browser or platform that does not match with the consumer's preference, he or she will simply look elsewhere for a better solution. Similarly, if a web service designed for businesses is incompatible with some browsers or platforms, the provider of that service risks losing customers.

On the other hand, service providers must balance customer's desires for seamless access to digital content and functionality with security considerations.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
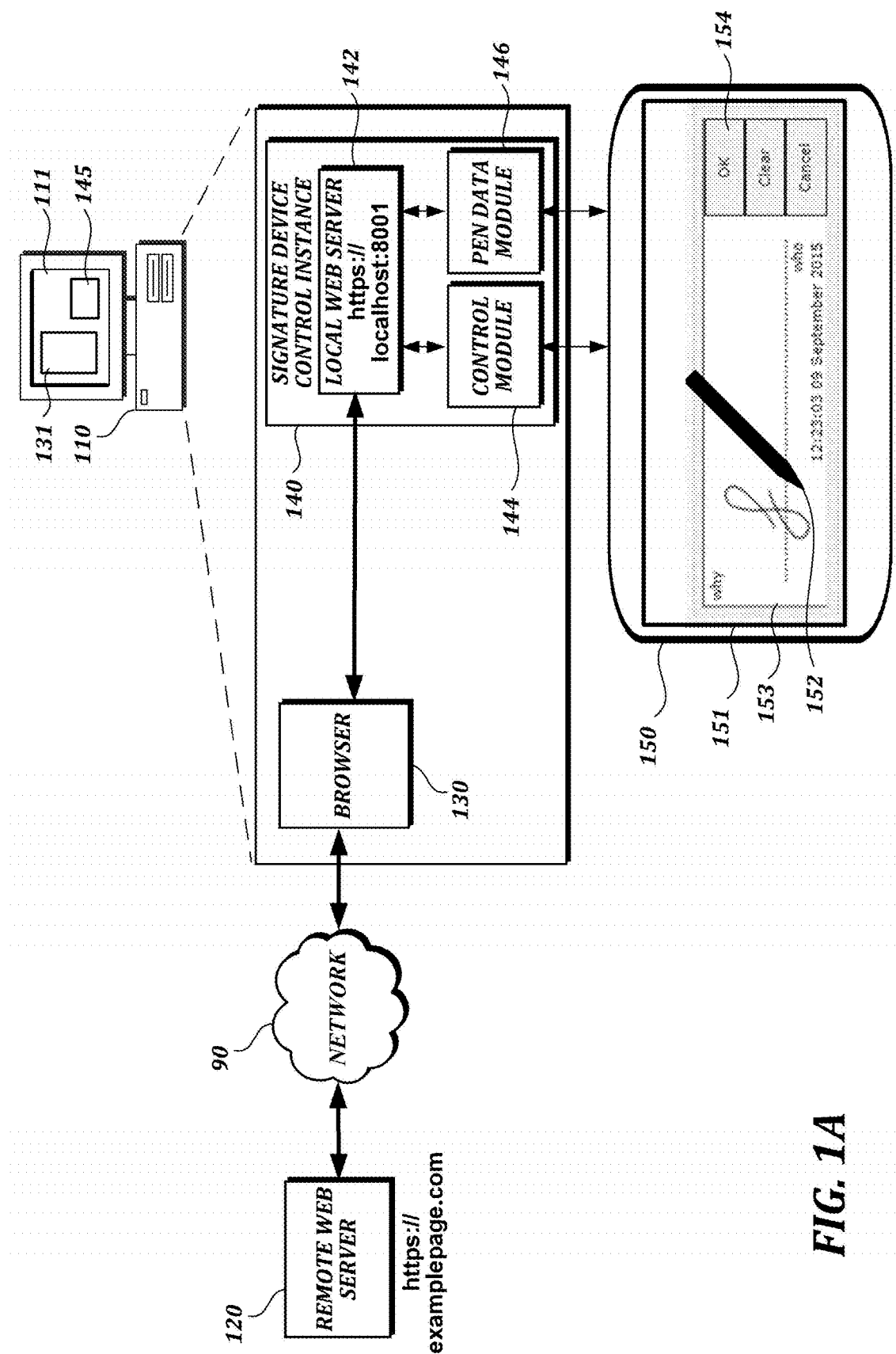
FIG. 1A is a block diagram of an illustrative system in which described embodiments may be implemented.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

I. INTRODUCTION

A signature platform suitable for modern web applications and web browsers is described herein. In described embodiments, a local computing device is communicatively coupled to a signature device. A web browser executing on a local computer communicates with a remote web server and a secure local web server that provides signature functionality. Described embodiments include embodiments suitable for multi-user scenarios. Such embodiments may be particularly useful in situations where large numbers of signatures are collected by many users, such as in a bank branch. In one such embodiment, the web browser communicates with an arbitrator service using a known port number. The arbitrator service tells the web browser the port number of the local web server that matches the user. The web browser connects to the local web server using the port number and allows use of the signature functionality only if it is authorized for that user.

As used herein, the term "signature devices" refers to devices that capture handwriting input for signatures. Signature devices may be implemented as dedicated signature collection devices or as general purpose devices, such as suitably configured smart phones or tablet computers. Signature devices are not necessarily strictly input devices, and may include other functionality (e.g., display functionality, data transmission functionality, etc.). Further details on illustrative signature devices are provided below.

A. First Illustrative Embodiment

In this section, a first illustrative embodiment is described in which a local computing device (such as a desktop computer, notebook computer, or any other suitable computing device) communicatively coupled to a signature device (e.g., a dedicated signature tablet or other device suitable for collecting signatures) provides the ability for a user sign an electronic document provided by a remote server to the local computing device over a network, such as the Internet.

FIG. 1A is a block diagram of an illustrative system in which described embodiments may be implemented. In the example shown in FIG. 1A, a local computer 110 communicates with a remote web server 120 over a network 90, such as the Internet, via a web browser 130. For security, the remote web server may use HTTPS to communicate with the web browser 130, and may use a certificate signed by a trusted certificate authority. The local computer 110 launches a signature device control instance 140, which includes a local web server 142, a control module 144, and a data module 146. Therefore, in this example, when the signature device control instance 140 is launched, a corresponding local web server 142 is also launched. However, as explained below, it is also possible, and may at times be preferable to provide a signature device control instance 140 without a corresponding local web server 142. Although the signature device control instance can be used in combination with the web browser 130, the signature device control instance can be launched separately from the web browser 130, and need not be provided as a plug-in component to the browser. The signature device control instance 140 and the local web server 142 can be launched at computer start-up time (e.g., before the web browser 130 is launched), or at some other time (e.g., in response to user input or input from the web browser 130 indicating that a signature is expected).

In the example shown in FIG. 1A, the local computer 110 provides a graphical user interface 111 with user interface elements 131, 145 (e.g., application-specific windows) for interacting with the web browser 130 and control module 144, respectively. The control module 144 controls a signature device 150 and the data module 146 receives signature data (e.g., pen event data, such as coordinate data and pressure data, or signature data other than pen event data (e.g., an image of the signature, biometric data, etc.)) that corresponds to the signature from the signature device 150. The content of the signature data may depend on the configuration or capabilities of the signature device control software or the signature device itself. For example, signature data may include a digital image of the signature, pen event data, other signature data, or some combination of such data. In this example, the signature device includes an LCD screen 151 that displays an electronic document (e.g., a contract), including a signature area 153 provided by the control module 144 on which a signature is being made with a pen device 152, and user interface elements 154 (e.g., "OK," "Clear," and "Cancel" buttons) that can be used to confirm that a signature is complete, to clear a signature, to cancel a signature, etc. Signature data corresponding to the signature being made can be provided as input to the data module 146.

Figure 1B:
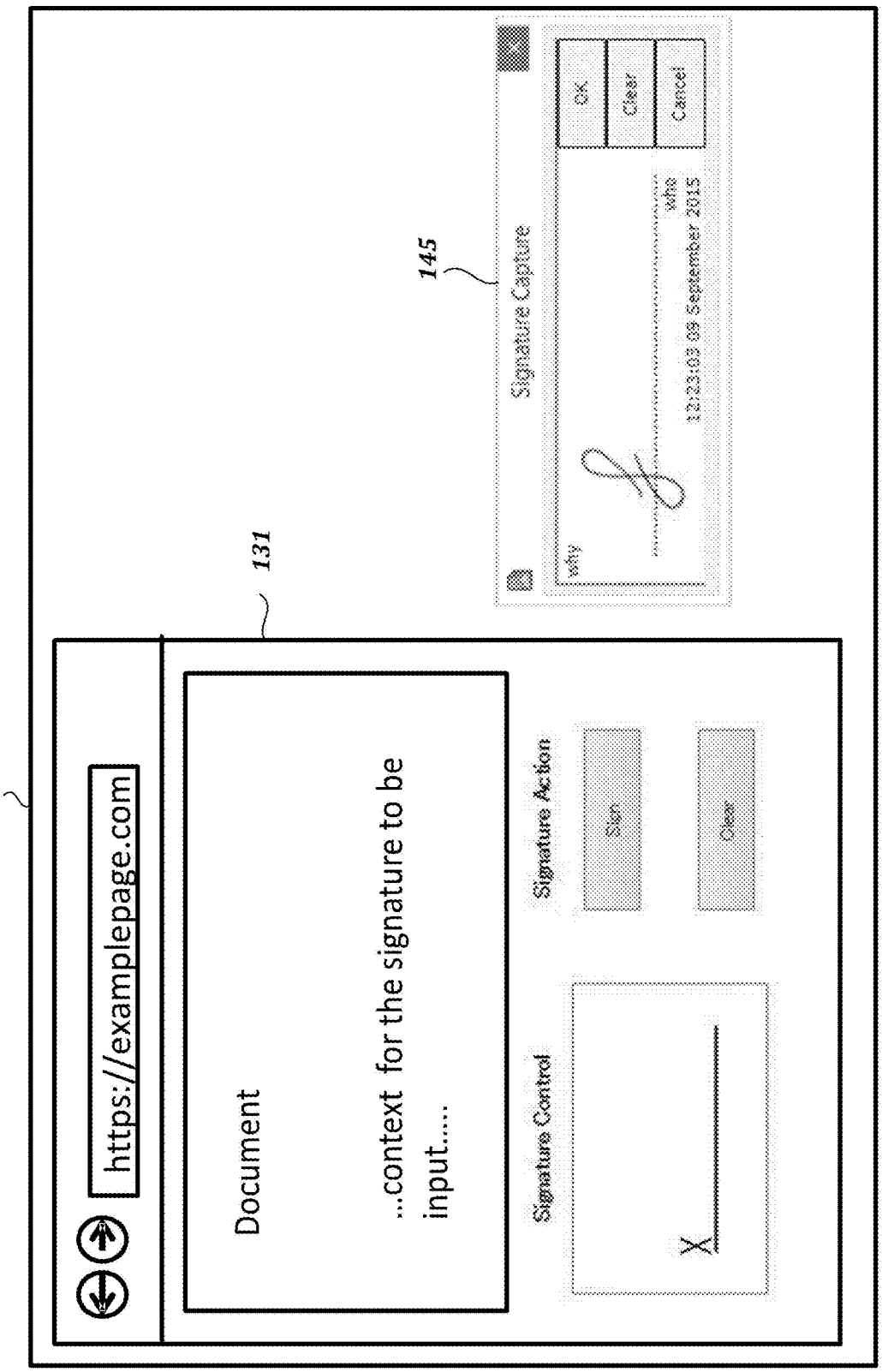
FIG. 1B is a screen shot of an illustrative graphical user interface including a browser window and a signature capture window.

FIG. 1B is a screen shot of an illustrative graphical user interface 111 including a browser window 131 and a signature capture window 145. In the example shown in FIG. 1B, code corresponding to a document and related user interface elements (e.g., HTML code and JavaScript code) are downloaded from the remote web server 120 and rendered in the browser window 131. The signature device control instance 140 causes the signature capture window 145 to be displayed on the local computing device and, in the example shown in FIG. 1A, on the LCD screen 151 of the signature device 152.

In general, signature devices may use electromagnetic resonance (EMR) technology, in which a digitizer incorporates a sensor board that detects the pen's movement and energy is induced in the pen's resonant circuit by a magnetic field generated by the sensor board surface. The pen's resonant circuit then makes use of this energy to return a magnetic signal to the sensor board surface. The board detects the pen's coordinate position at regular time intervals even if the electronic pen does not touch the sensor board surface, so long as the pen remains within close enough proximity to the sensor board, such that signals can still be received from the pen. (The effective signal range can vary depending on the particular technology being used, but is generally on the order of several millimeters.)

Alternatively, other handwriting input technology can be used. For example, an electronic pen may use other wireless technology or may be connected by a wire to a digitizer. As another example, an electronic pen may or may not be detectable away from the surface of a digitizer. As another example, an electronic pen may be powered or unpowered. Powered pens may receive power via a wire connected to an external power source or via an on-board battery. As another example, it is possible to input handwriting data without an electronic pen (e.g., via a stylus on a pressure sensitive digital writing pad, a touchscreen, or some other input device that does not require an electronic pen).

However the handwriting data may be collected, handwriting data provided by signature devices may include pen event information, device information, and/or contextual information about the context in which the handwriting was made. Pen event information may include the x/y position of the pen-tip on or above the digitizer surface and the time since the start of the handwriting. In addition to x/y-coordinate values, pen event information may optionally include additional information subject to the capabilities of the signature device, such as pressure (pen force), angles (azimuth, altitude, and/or rotation) and pen-down status. Pen event information is typically collected at regular intervals during a signing process.

Figure 1C:
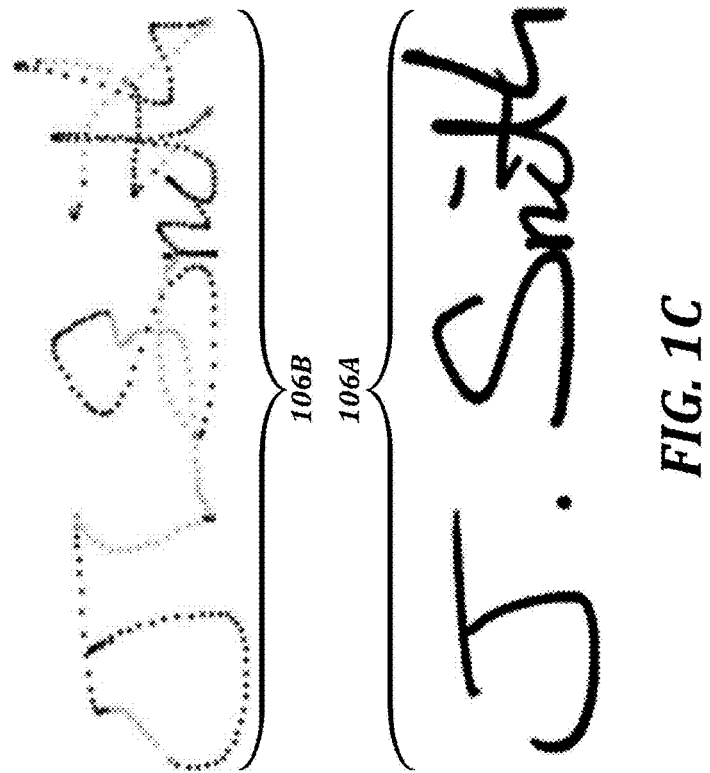
FIG. 1C is a diagram showing an illustrative handwritten signature and a representation of the signature.
Figure 1D:
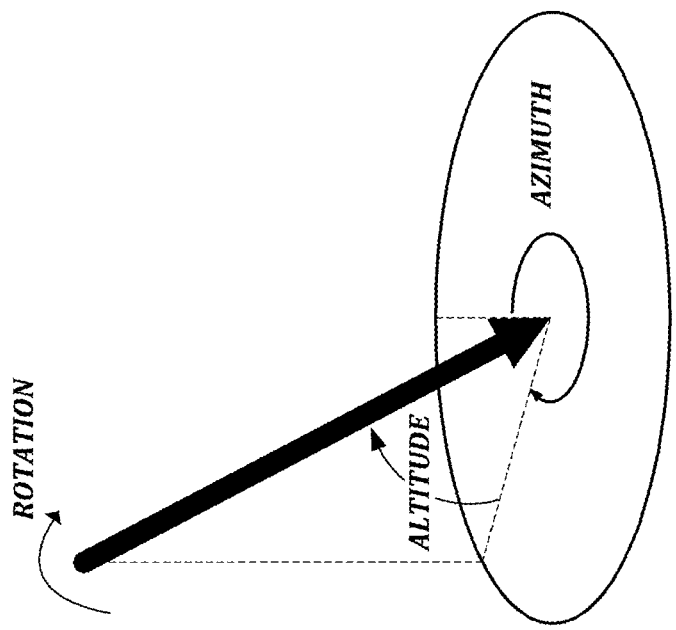
FIG. 1D is a diagram showing parameters that can be detected for a pen device.

In the example shown in FIG. 1C, an illustrative handwritten signature 106A comprises a plurality of pen events detected by a pen device and digitizer using technology (e.g., EMR technology) that allows pen events to continue to be detected when the pen is lifted from the surface of the digitizer, as long as the pen remains within signal range. In the representation 106B of the signature 106A, coordinates detected when the pen is up are depicted as lighter dots, and coordinates detected while the pen is down are depicted as darker dots. In the example shown in FIG. 1D, rotation, altitude, and azimuth are among the parameters that can be detected for a pen device (represented by a large black arrow).

Referring again to FIG. 1A, the local web server 142 allows the browser 130 to control signature functionality in a secure way, without the use of locally installed plug-ins or controls, such as ActiveX controls, that must be configured specifically for the type of browser that uses them. In this example, the local web server 142 is started in the background on startup. The browser 130 loads the web page from the remote web server 120. The web page also may provide a framework (e.g., a JavaScript framework) that allows the web page to make successive calls to the local web server 142 using a cross-domain technique (e.g., a JSON-P (JavaScript Object Notation with Padding) technique, CORS (Cross-origin Resource Sharing) technique, or a technique that complies with the WebSocket protocol) and HTTPS Get calls. The local web server 142 can receive these calls, interpret the calls, and use the control module 144 to control the signature device 150.

In an illustrative scenario, a user of the local computer 110 visits a web page (e.g., https://examplepage.com/demo.htm) that includes code that loads a library (e.g., <script src="signaturesdk.js"></script>) with functions for controlling a signature device at the local computer. The signaturesdk.js file is part of the web page and provides the code for those functions, but the web page relays the execution of those functions to the local web server. The code may include a cross-domain reference (that is, a reference to a domain other than the domain of the web page) indicating a URL for the local web server 142 (e.g., "https://localhost:"). The code can be sent using a cross-domain technique, such as the JSON-P technique. Although the JSON-P technique can be used to communicate with other remote servers, here it is used to communicate with the local web server 142 running on the local computer 110.

For security, the local web server 142 also may use HTTPS to communicate with the web browser 130. The local web server also may use a certificate signed by a certificate authority, such as a unique certificate authority that was created and installed on the computer 110 during installation of signature software corresponding to the signature device control instance 140. This way, the web browser 130 will accept the certificate used by the local web server 142 as authentic. By using a unique certificate authority and certificate on each computer, if the certificate/certificate authority used by one computer is compromised, the security of all other computers using this system is not necessarily compromised.

Depending on implementation, the local web server 142 optionally may also create, store, keep track of, and finally destroy ActiveX control instances. In such an implementation, the local web server 142 may generate a unique and random ID for each ActiveX control instance and share the IDs with the web browser 130.

Figure 2:
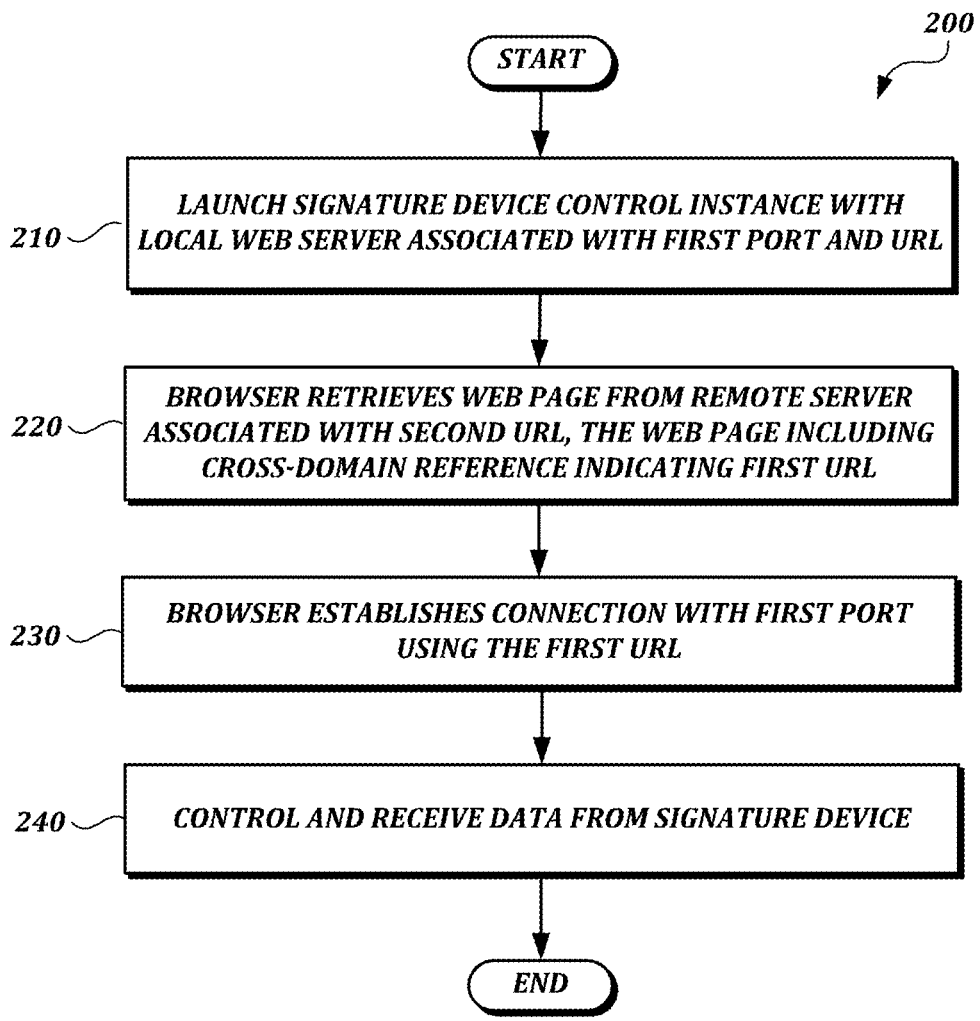
FIG. 2 is a flow chart of a process according to the first illustrative embodiment.

FIG. 2 is a flow chart of a process 200 according to the first illustrative embodiment. In the example shown in FIG. 2, at step 210 a local computing device (e.g., the local computer 110 shown in FIG. 1A) launches a signature device control instance (e.g., a control instance that uses Signature SDK or STU SDK, available from Wacom Co., Ltd.) including a local web server associated with a first port and a first URL. The signature device control instance allows the local computing device to control the signature device and receives signature data from the signature device. The local web server listens to the first port. At step 220, a web browser executing on the local computing device retrieves a web page from a remote server associated with a second URL (e.g., via a secure connection such as an HTTPS connection).

The web page provides code to be rendered or executed on the local computing device. This code provides context (e.g., visual context in the form of an electronic document with a designated signature area) for a signature to be input by the signature device. This code also provides a cross-domain reference indicating the first URL (e.g., "https:// localhost:"). For example, the cross-domain reference may be provided in cross-platform scripting language code, such as JavaScript.

At least some of the code provided by the web page may be provided using a secure cross-domain technique, such as a JSON-P technique or a CORS technique, in view of same-origin policies that may be in effect in modern web browsers.

At step 230, the web browser establishes a connection (e.g., an HTTPS connection) with the first port listened to by the signature device control instance using the first URL. At step 240, the web browser controls and receives signature data (e.g., pen event data, such as coordinate data and pressure data, or signature data other than pen event data (e.g., an image of the signature, biometric data, etc.)) from the signature device. For example, referring again to the examples shown in FIGS. 1A and 1B, the web browser 130 establishes a connection with a first port listened to by the signature device control instance 140 using the URL for the local web server. When the "Sign" button is clicked in the browser window 131, the browser invokes the signature device control instance 140 to control the signature device 152.

In this way, the web browser is able to provide the context for the signature and facilitate collection of the signature from a user (e.g., a bank customer). The web browser can send the data received from the signature device, or data created by the received data, to the remote web server or a server associated with the remote web server for further processing. For example, after the web browser instance has received and processed the signature data, the web browser instance could upload the data to the remote web server using an HTTP POST request, or using cross-domain techniques, as appropriate. In any of the examples described herein, the signature data can be used for many different purposes, such as recording the signature, determining whether consent has been given for something, comparing the signature with other known-good signatures to verify its validity, or to retrieve a signed document. The web browser may send the received data in combination with document data (e.g., in the form of an image of the signed document).

II. MULTI-USER IMPLEMENTATIONS

In this section, illustrative multi-user implementations are described with reference to second, third, and fourth illustrative embodiments. In described embodiments, a local computing device (such as a desktop computer, notebook computer, or any other suitable computing device) provides the ability for multiple users to use one or more signature devices to sign electronic documents provided by a remote server to the local computing device (e.g., via a web browser) over a network, such as the Internet.

In illustrative embodiments described herein, signature device control instances may be associated with particular user sessions (e.g., Windows user sessions), e.g., to take advantage of user interface (UI) elements (e.g., Windows UI elements) or other aspects made available by the user session. This may be useful, for example, where the signature device includes a screen that is managed by an active user session when in use. When capturing a signature, a window may be created that shows the signature while it is being captured (e.g., as shown within the signature device 150 in FIG. 1A), and that window may be created in the active user session. The signature device control instance can be executed in the background while the user session is active. It is possible for more than one signature device control instance to be associated with a single user session.

Figure 3A:
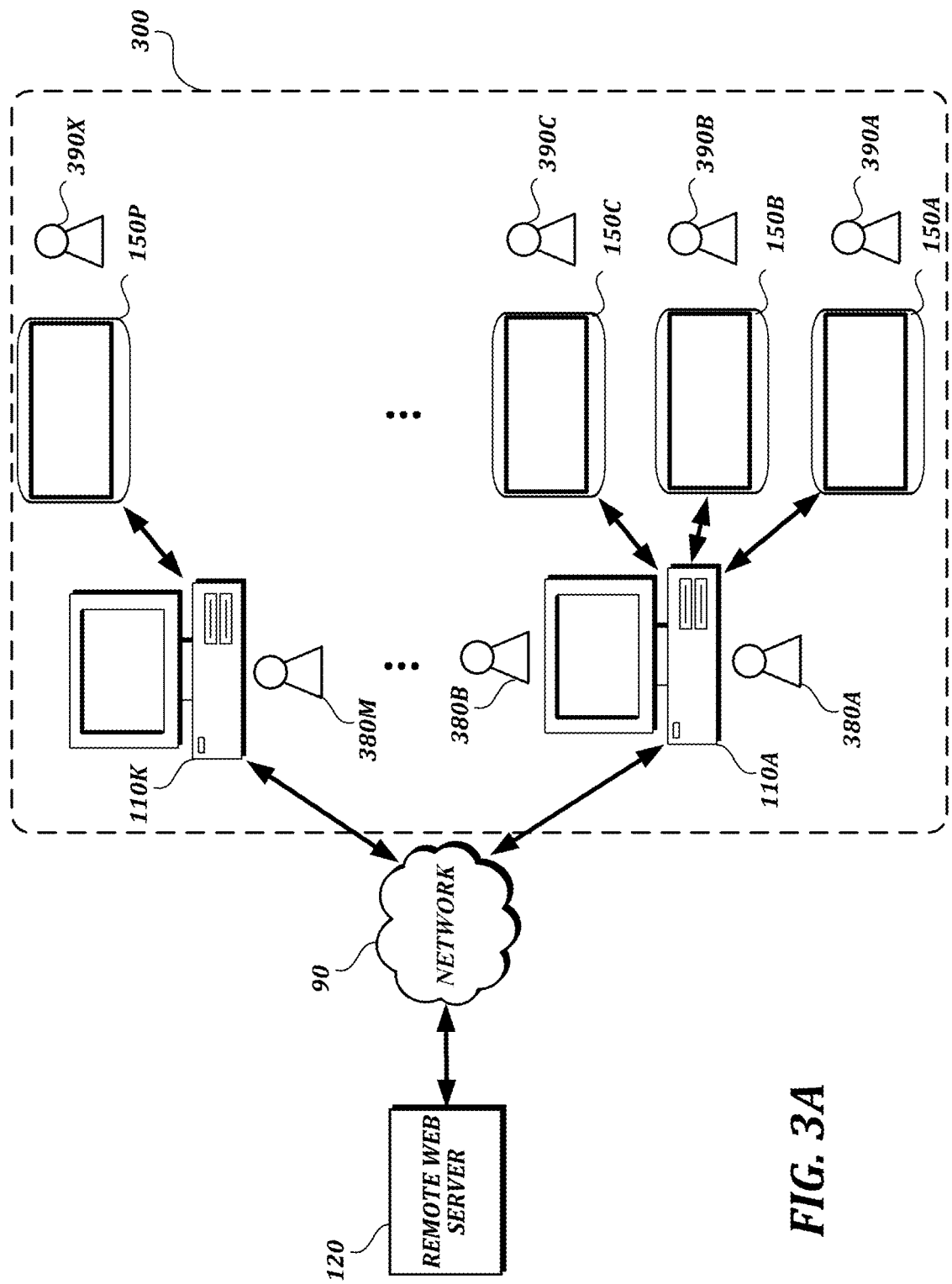
FIG. 3A is a system diagram depicting an illustrative multi-user environment in which illustrative embodiments described herein may be implemented.

FIG. 3A is a system diagram depicting an illustrative multi-user environment 300 in which illustrative embodiments described herein may be implemented. In the example shown in FIG. 3A, a local branch of ABC Bank has M employees 380A-M and K computers 110A-K that are communicatively coupled (e.g., via wired or wireless connections) to P signature devices 150A-P (e.g., dedicated signature tablets). In this example, any of the employees 380A-M can log in to any of the illustrated computers 110A-K, and each employee owns a user account. Computers 110A-K may have a single connected signature device, or multiple signature devices connected at the same time. Many customers 390A-X may visit the bank branch during a business day. In a typical usage scenario, when a tablet is in use by one customer, other customers cannot use that tablet. Therefore, in a typical usage scenario, the maximum number of customers that may be using tablets at any one time is limited by the number of tablets.

In an illustrative usage scenario, bank employee 380A logs into computer 110A. Customers 390A and 390B (e.g., a married couple) arrive, and bank employee 380A directs them to use tablets 150A and 150B, respectively, to sign a document. A web browser process on computer 110A loads a web page that contains an application framework to use the tablets 150A and 150B from the web browser, which may be displayed on a display device of the computer 110A. The tablets 150A and 150B also may provide a visual context, such as an image of the document being signed, or a portion of it, on a display device of the respective tablet. In the example shown in FIG. 3A, the web page is served by the ABC Bank remote web server 120. Alternatively, browser processes could load different web pages from different servers, and the example would work in the same way, provided that those web pages include a suitable application framework to use the tablet.

In the illustrative usage scenario, customer 390A finishes his signature on tablet 150A in a corresponding portion of the document. Customer 390B does not complete her signature on tablet 150B. Customer 390C arrives and has a priority item that must be signed immediately. Bank employee 380B switches the computer 110A to his account, and the user account of bank employee 380A is locked. Customer 390C takes control of tablet 150C, as it is not currently being used, to sign the priority item, while tablet 150B is still in use by customer 390B. Customer 390C finishes his signature. Bank employee 380B logs out of computer 110A, and bank employee 380A switches computer 110A back to his user account. Customer 390B then finishes her signature.

Figure 3B:
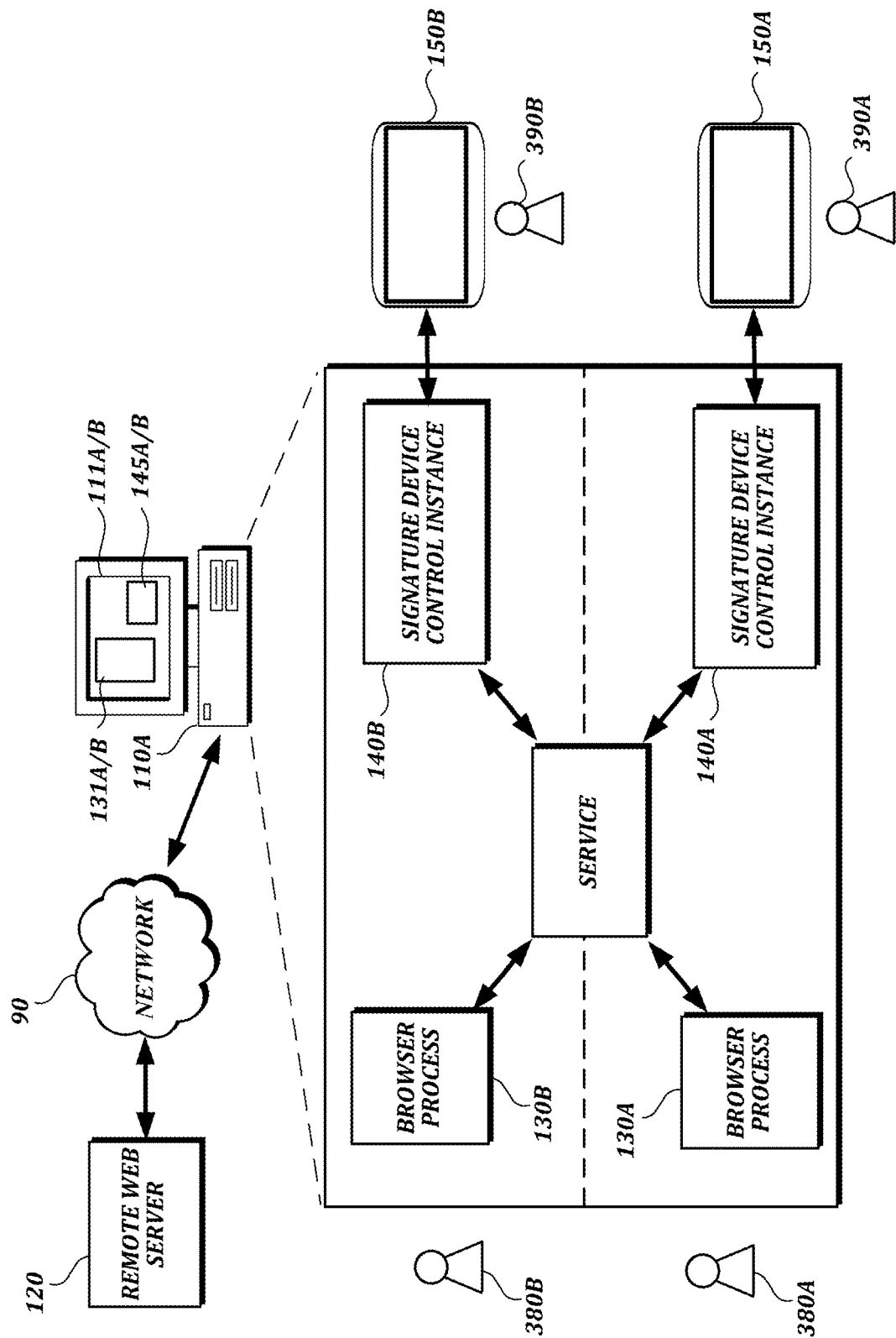
FIG. 3B is a system illustrating a multiple-user session in more detail.

FIG. 3B is a system illustrating the multiple-user session described above in more detail. In the example shown in FIG. 3B, the user sessions of bank employees 380A and 380B are illustrated on either side of the dashed line within the expanded illustration of computer 110A. As one user session is locked, and another user session is activated (e.g., via known techniques for locking or switching between user sessions, such as Windows user sessions), the computer 110A can switch between user interfaces 111A and 111B associated with each session, including corresponding browser windows 131A and 131B (associated with browser processes 130A and 130B, respectively) and signature capture windows 145A and 145B (associated with signature device control instances 140A and 140B, respectively).

As will be understood, when a user session is locked in Windows, the session and all the programs and processes running under the session remain active, but run in the background with limited capabilities, and do not have control of monitor screens. The locked user session may not have control of some input devices, such as microphones or video cameras. A signature control device instance can still run in the background when the user session is locked, but new windows for that user session will not be created while the session is locked. Importantly, however, the signature device can continue to communicate with a browser process when the signature device control instance is running in the background, as described in further detail below. Depending on the type of the signature device, a user may still be able to use a signature device even when the signature device is connected to a signature device control instance of a locked session.

Optionally, as explained in further detail below, a service (e.g., an arbitrator service or a proxy service) can be used to switch between signature device control instances 140A and 140B.

Referring again to the example shown in FIG. 3A, there are 3 tablets connected to computer 110A, and three customers use the tablets. However, as illustrated by the example just described, customers also can share tablets, even if they may not use them at exactly the same time. Tablets do not need to be bound to a specific user account. In addition, it is possible for more than one user (e.g., bank employees 380A and 380B) to use a computer with only one signature device, in accordance with described embodiments. For example, as users switch between user sessions, control of the single signature device can be passed back and forth between the signature device control instances of the respective user sessions.

A. Second Illustrative Embodiment

In this section, a second illustrative embodiment is described. In this embodiment, the same port number is used to communicate with all signature device control instances via their respective local web servers. In an illustrative usage scenario, now described with reference to FIG. 3A, bank employee 380A logs in to computer 110A, thereby creating a user session, and a signature device control instance is started with a local web server listening to a pre-determined port number (e.g., 8000). A browser executing on computer 110A connects to the local web server using the pre-determined port number. Bank employee 380A locks the user session, connections between the browser and the local web server are suspended, and the local web server stops listening to the port. Bank employee 380B then logs in to computer 110A, thereby creating a second user session, and a new signature device control instance is started with a second local web server listening to the same port number (8000, in this example). When bank employee 380B locks the second user session, connections between the browser and the second local web server are suspended, and the second local web server stops listening to the port. If bank employee 380A logs in again to his previously locked session, the previously suspended connections associated with the first local web server are restored, and the web server begins listening to the port again.

Thus, in this embodiment, the optional service (see FIG. 3B) is not used, and only the active user session will have a local web server listening to the port. This embodiment achieves the goal of allowing multiple users with a straightforward solution, but may not be effective or desirable in every case. For example, when a user locks a session, there may be a delay until the connections to its local web server are actually closed or suspended and the server stops listening to the port. As another example, when a user logs in to a previously locked session, there may be a delay until the local web server is ready. This embodiment also stops information flow between the browser and the local web server when the user session is locked, and is not effective for scenarios in which multiple user sessions are active at the same time.

B. Third Illustrative Embodiment

In this section, a third illustrative embodiment is described. In this embodiment, an arbitrator service connects web browser processes with signature device control instances.

Figure 4:
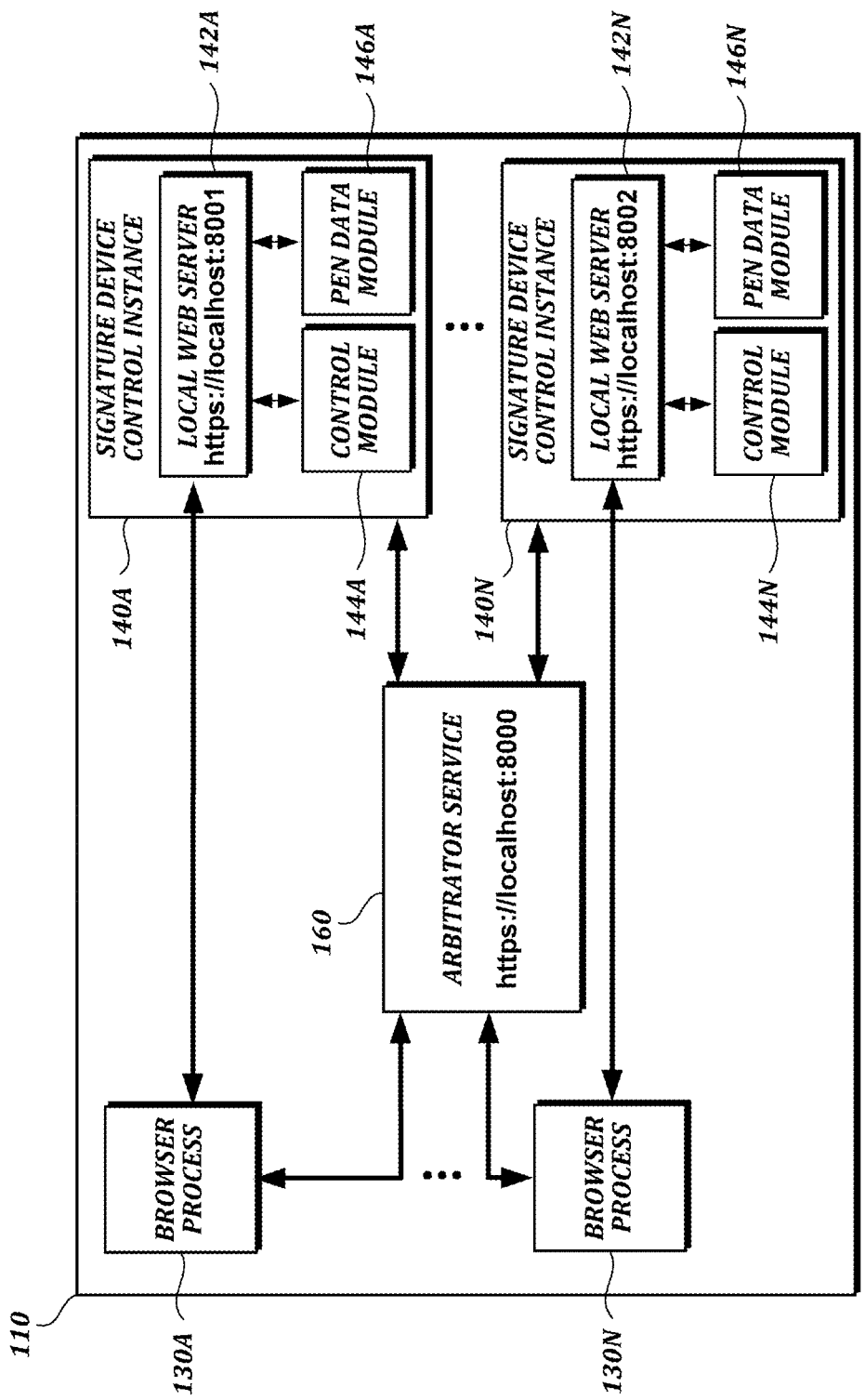
FIG. 4 is a block diagram of an embodiment of an illustrative local computer with which the third illustrative embodiment, or other embodiments, may be implemented.

FIG. 4 is a block diagram of another embodiment of an illustrative local computer 110 with which the third illustrative embodiment, or other embodiments, may be implemented. In the example shown in FIG. 4, an arbitrator service 160 is started on start-up of the computer 110, and starts a localhost web server listening to a pre-determined port number (8000, in this example). The arbitrator service 160 may be any service that can be used by multiple user sessions, such as a Windows service, a Unix daemon, or the like.

The computer 110 launches signature device control instances 140A-N for N users, with corresponding local web servers 142A-N, control modules 144A-N, and data modules 146A-N. The signature device control instances 140A-N communicate with the arbitrator service 160. In this example, because the arbitrator service might be used by several signature device control instances 140A-N, the arbitrator service is launched before any signature device control instances 140A-N are launched.

The arbitrator service 160 assigns a different port to each of the local web servers 142A-N (e.g., 8001 and 8002, respectively, for a scenario with two local web servers). The web browser processes 130A-N communicate with the arbitrator service 160 via port number 8000. The web browser processes 130A-N request (e.g., via HTTPS Get requests, which create TCP socket connections) and obtain the port numbers assigned to the respective local web servers 142A-N from the arbitrator service 160. The web browser processes 130A-N are then able to communicate directly (e.g., using HTTPS calls) with the local web servers 142A-N using the respective port numbers. The web browser processes 130A-N may perform tests to confirm that the local web servers 142A-N are actually available (e.g., by sending an HTTPS Get echo message to the respective local web servers).

In an illustrative usage scenario, now described with reference to FIG. 3A, bank employee 380A starts a user session on computer 110A, and a first device control instance is started with a local web server. (The optional service in FIG. 3B, an arbitrator service, has been started previously.) In this scenario, the ability of the arbitrator service to assign different ports to different local web servers means that, if bank employee 380A locks the session, there need not be any change in communication between the browser and the local web server, because it has its own port. The local web server can keep a listening port open while a session is locked to easily maintain the state of the session (with all possible open socket connections), make locking and unlocking of the session transparent to the browser, and allow the browser to communicate with the local web server. This may be helpful, for example, if a web page generates requests for bank employee 380A's session that the local web server can answer while his session is locked, or if certain functions require a socket connection to be kept open, such as functions relating to signature capture.

If bank employee 380B creates a second user session, and a new device control instance is started with a second local web server, the browser can communicate with the second local web server using a different port number (e.g., 8002), while keeping the connection with the first local web server open. If bank employee 380A logs out, ending the user session, the arbitrator service can free the port number (e.g., by updating a table) so that another user can use it.

Some operating systems (e.g., Windows) may provide information on socket connections, such as the process ID at each end of a socket connection. In such cases, the arbitrator service can detect the user that is linked to the browser using that information. For example, the browser can call the arbitrator service using a socket connection, and the arbitrator service can use the operating system to learn the process ID of the browser and the user ID associated with that process ID. The arbitrator service can then find a matching port number for that user ID. Other operating systems may not provide such information. However, the arbitrator service can still detect when a user logs in or out, and keep track of the user in that way.

Figure 5:
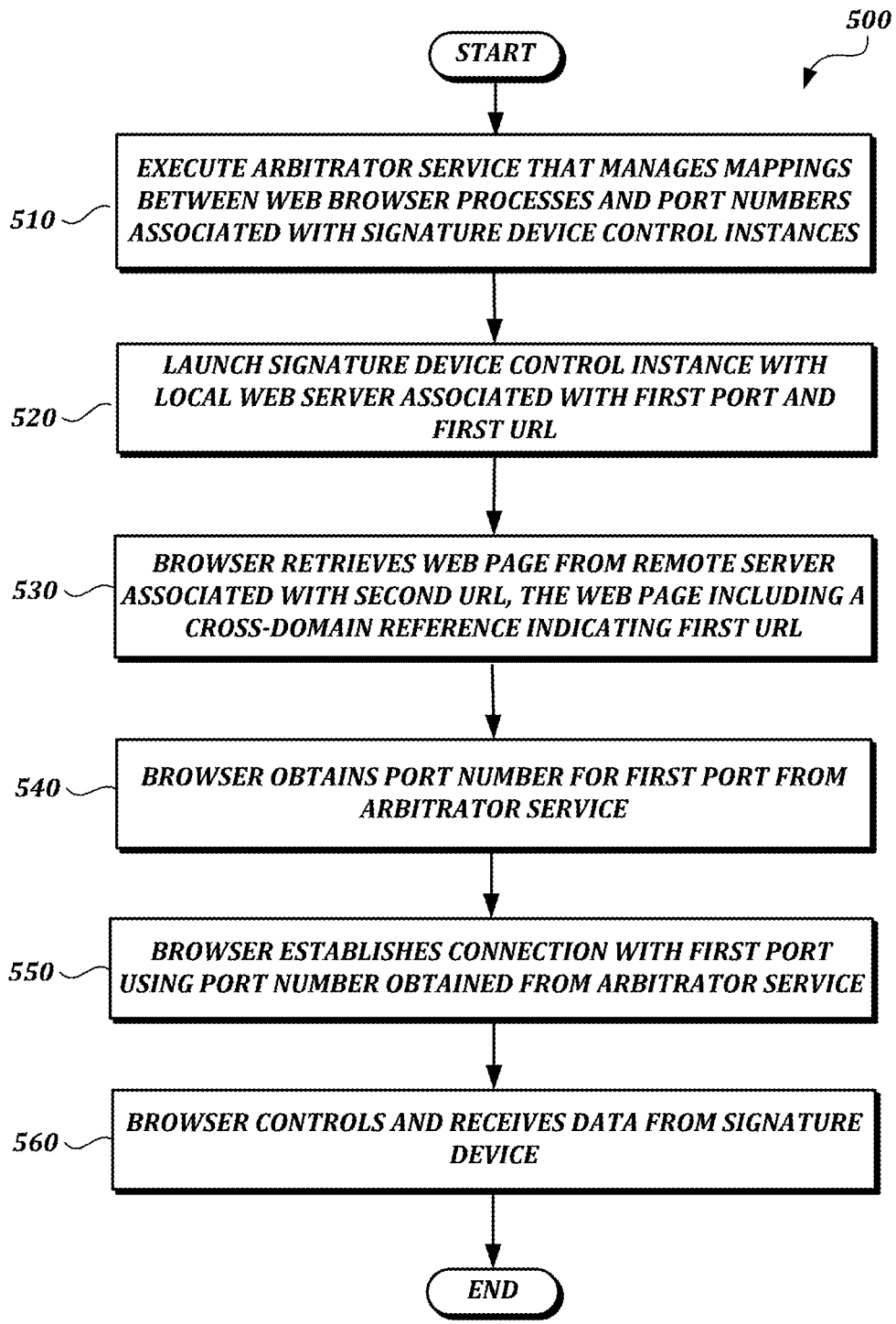
FIG. 5 is a flow chart of a process according to the third illustrative embodiment.

FIG. 5 is a flow chart of a process 500 according to the third illustrative embodiment. In the example shown in FIG. 5, at step 510 a local computing device (e.g., the local computer 110 shown in FIG. 4) executes an arbitrator service that manages mappings between web browser processes and port numbers associated with signature device control instances. At step 520, the local computing device launches a signature device control instance including a local web server associated with a first port and a first URL. At step 530, a web browser executing on the local computing device retrieves a web page from a remote server associated with a second URL (e.g., via a secure connection such as an HTTPS connection). The web page provides code (e.g., HTML, JavaScript, etc.) to be rendered or executed on the local computing device. The code includes a cross-domain reference indicating the first URL (e.g., "https://localhost:"). At least some of the code provided by the web page may be provided using a secure cross-domain technique, such as a JSON-P technique or a CORS technique, in view of same-origin policies that may be in effect in modern web browsers.

At step 540, the browser obtains the port number corresponding to the first port (which is listened to by the signature device control instance) from the arbitrator service, and at step 550, the browser establishes a connection (e.g., an HTTPS connection) with the first port. At step 560, the web browser controls and receives signature data (e.g., pen event data, such as coordinate data and pressure data, or signature data other than pen event data (e.g., an image of the signature, biometric data, etc.)) from the signature device.

The arbitrator service's management of the mappings may include assigning port numbers to particular user IDs, and retrieving those port numbers based on process IDs or user IDs. For example, the arbitrator service may obtain the process ID of a web browser process, obtain a user ID associated with the process ID, and obtain a port number of a port associated with the user ID (e.g., by looking up the port number in a table of assigned port numbers and user IDs).

C. Fourth Illustrative Embodiment

In this section, a fourth illustrative embodiment is described. In this embodiment, a web browser is able to communicate with signature device control instances via a proxy service.

Figure 6:
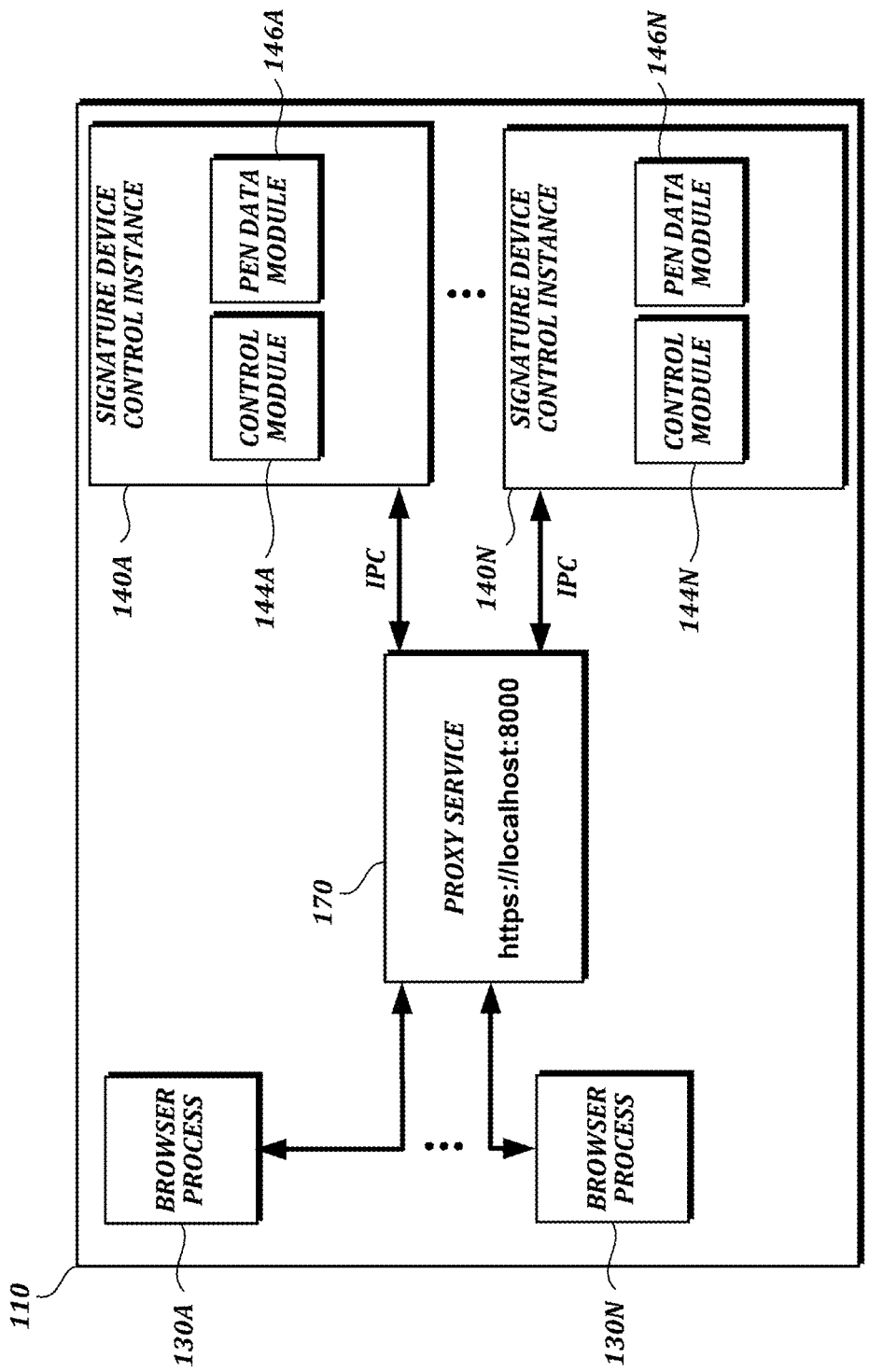
FIG. 6 is a block diagram of another embodiment of an illustrative local computer, with which the fourth illustrative embodiment, or other embodiments, may be implemented.

FIG. 6 is a block diagram of another embodiment of the illustrative local computer 110, with which the fourth illustrative embodiment, or other embodiments, may be implemented. In the example shown in FIG. 6, a proxy service 170 is started on start-up of the computer 110, and starts a localhost web server listening to a pre-determined port number (8000, in this example). The computer 110 launches signature device control instances 140A-N for N users, with corresponding control modules 144A-N, and data modules 146A-N. The web browser processes 130A-N communicate with the proxy service 170 via a single port number 8000, and the proxy service communicates with the device control instances 140A-N using inter-process communications (IPC). Thus, in this embodiment, only one local web server port is needed, and the device control instances 140A-N do not need to provide their own separate local web servers. No direct communication between the web browser processes 130A-N and the device control instances 140A-N is needed.

The communication between the proxy service and the signature device control instances can be implemented in many different ways using IPC techniques, such as by using sockets, shared memory, files, pipes, signals, message passing, etc.). Using a proxy service may add a delay, as it will take a finite amount of time for the proxy service to receive messages and redirect them to the appropriate signature device control instance. The delay will depend upon implementation, but because the processing complexity overhead added is minimal, it will not be noticeable to the user. Using a proxy and only one port number eases the configuration of the system and the browser side, as the browser only has to connect to the proxy. Also, the number of free ports is limited (e.g., 1 to 65535), security policies may limit the available port number range, and many port numbers may already be in use by other applications. Therefore, assigning a different port number to each active user might not be possible in some cases. The proxy service therefore provides a valuable alternative.

In an illustrative usage scenario, now described with reference to FIG. 3A, bank employee 380A starts a first user session on computer 110A, and a first device control instance is started. (The optional service in FIG. 3B, a proxy service, has been started previously.) While the first user session is active, the web browser calls a function that requires an HTTPS/TCP socket connection to remain open. As an example, a function such as DynamicCapture::Capture may create a window on a tablet in which a signature is to be captured. The HTTPS/TCP socket connection is created between the browser and the proxy service, which is a local web server listening to port 8000. In turn, the proxy service communicates with the first device control instance using IPC. The first device control instance creates a window and the signature capture starts on the tablet. If bank employee 380A locks his session and bank employee 380B starts a new session, there need not be any change in communication between the browser and the first device control instance, because the browser can communicate with multiple device control instances via the same port (8000, in this example). When bank employee 380A logs back in, the signature capture window is still open, and the HTTPS/TCP socket connection is still open. When the signature is completed, the window and the socket connection can be closed. In this example, an HTTPS Get request may return saying that the signature has been captured.

Figure 7:
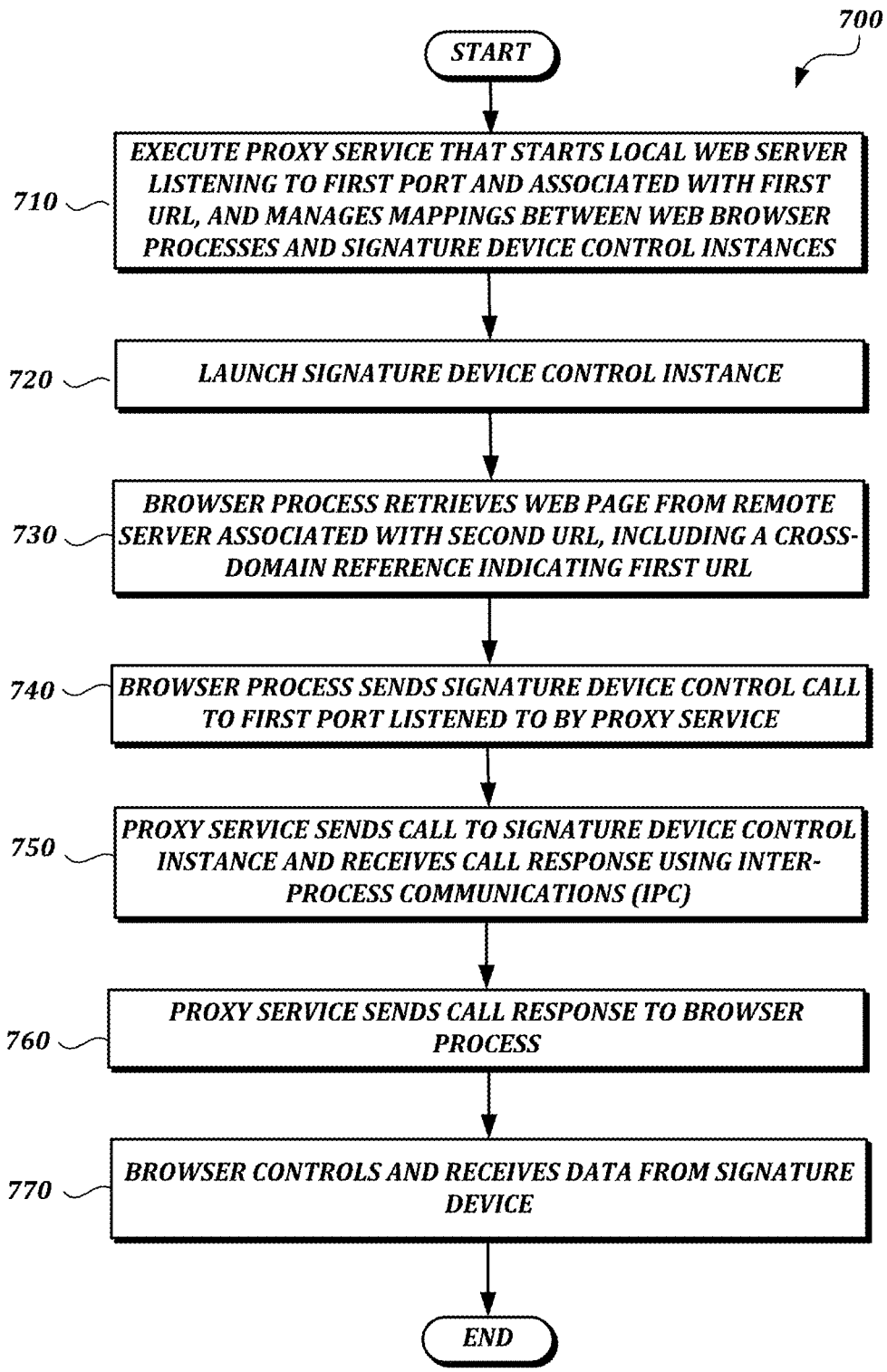
FIG. 7 is a flow chart of a process according to the third illustrative embodiment.

FIG. 7 is a flow chart of a process 700 according to the third illustrative embodiment. In the example shown in FIG. 7, at step 710 a local computing device (e.g., the local computer 110 shown in FIG. 6) executes a proxy service that manages mappings between web browser processes and signature device control instances. The proxy service also starts a local web server that listens to a first port and is associated with a first URL. At step 720, the local computing device launches a signature device control instance. At step 730, a web browser process executing on the local computing device retrieves a web page from a remote server associated with a second URL (e.g., via a secure connection such as an HTTPS connection). The web page provides code including a cross-domain reference indicating the first URL (e.g., "https://localhost:"). At least some of the code provided by the web page may be provided using a secure cross-domain technique, such as a JSON-P technique or a CORS technique.

At step 740, the browser process sends a signature device control call to the first port, which is listened to by the proxy service. At step 750, the proxy service uses IPC to send the call to the signature device control instance and receive a call response. At step 760, the proxy service sends the call response to the browser process. At step 770, the browser process controls and receives signature data (e.g., pen event data, such as coordinate data and pressure data, or signature data other than pen event data (e.g., an image of the signature, biometric data, etc.)) from the signature device.

The proxy service's management of the mappings may include obtaining the process ID of the browser process, obtaining a user ID associated with the process ID, and obtaining specific information for using IPC to communicate with the signature device control instance associated with the user ID.

III. COMPUTING ENVIRONMENT

Unless otherwise specified in the context of specific examples, the embodiments described herein, or other embodiments, may be implemented by any suitable computing devices, including, but not limited to, laptop computers, desktop computers, smart phones, tablet computers, dedicated signature capture tablets, or combinations of such devices.

Figure 8:
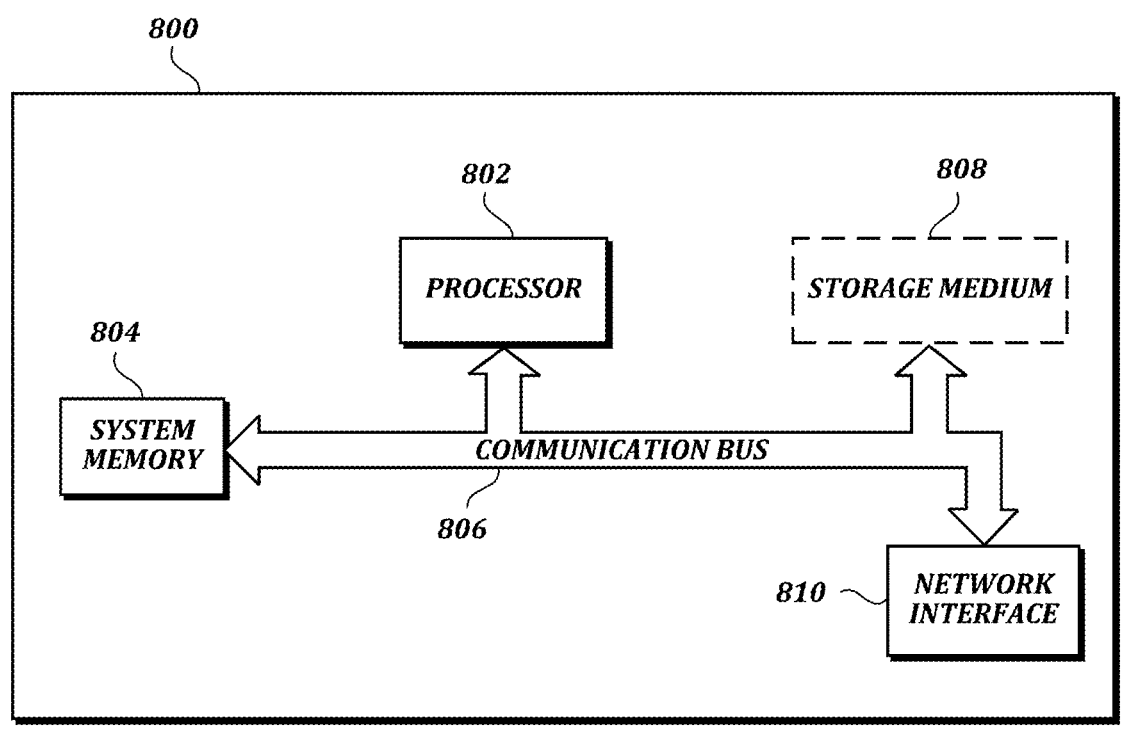
FIG. 8 is a block diagram that illustrates aspects of an exemplary computing device appropriate for use in accordance with embodiments of the present disclosure.

FIG. 8 is a block diagram that illustrates aspects of an exemplary computing device 800 appropriate for use in accordance with embodiments of the present disclosure. The description below is applicable to servers, personal computers, mobile phones, smart phones, tablet computers, embedded computing devices, and other currently available or yet to be developed devices that may be used in accordance with embodiments of the present disclosure.

In its most basic configuration, the computing device 800 includes at least one processor 802 and a system memory 804 connected by a communication bus 806. Depending on the exact configuration and type of device, the system memory 804 may be volatile or nonvolatile memory, such as read only memory ("ROM"), random access memory ("RAM"), EEPROM, flash memory, or other memory technology. Those of ordinary skill in the art and others will recognize that system memory 804 typically stores data and/or program modules that are immediately accessible to and/or currently being operated on by the processor 802. In this regard, the processor 802 may serve as a computational center of the computing device 800 by supporting the execution of instructions.

As further illustrated in FIG. 8, the computing device 800 may include a network interface 810 comprising one or more components for communicating with other devices over a network. Embodiments of the present disclosure may access basic services that utilize the network interface 810 to perform communications using common network protocols. The network interface 810 may also include a wireless network interface configured to communicate via one or more wireless communication protocols, such as WiFi, 2G, 3G, 4G, LTE, WiMAX, Bluetooth, and/or the like.

In the exemplary embodiment depicted in FIG. 8, the computing device 800 also includes a storage medium 808. However, services may be accessed using a computing device that does not include means for persisting data to a local storage medium. Therefore, the storage medium 808 depicted in FIG. 8 is optional. In any event, the storage medium 808 may be volatile or nonvolatile, removable or non-removable, implemented using any technology capable of storing information such as, but not limited to, a hard drive, solid state drive, CD-ROM, DVD, or other disk storage, magnetic tape, magnetic disk storage, and/or the like.

As used herein, the term "computer readable medium" includes volatile and nonvolatile and removable and non-removable media implemented in any method or technology capable of storing information, such as computer readable instructions, data structures, program modules, or other data. In this regard, the system memory 804 and storage medium 808 depicted in FIG. 8 are examples of computer readable media.

For ease of illustration and because it is not important for an understanding of the claimed subject matter, FIG. 8 does not show some of the typical components of many computing devices. In this regard, the computing device 800 may include input devices, such as a keyboard, keypad, mouse, trackball, microphone, video camera, touchpad, touchscreen, stylus, and/or the like. Such input devices may be coupled to the computing device 800 by wired or wireless connections including RF, infrared, serial, parallel, Bluetooth, USB, or other suitable connection protocols using wireless or physical connections.

In any of the described examples, data can be captured by input devices (e.g., signature devices) and transmitted or stored for future processing. The processing may include encoding data, which can be subsequently decoded for presentation by output devices. Input devices can be separate from and communicatively coupled to computing device 800, or can be integral components of the computing device 800. The computing device 800 may also include output devices such as a display or touchscreen. The output devices can be separate from and communicatively coupled to the computing device 800, or can be integral components of the computing device 800. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™ PHP, Perl, Python, Ruby, HTML, CSS, JavaScript, VBScript, ASPX, Microsoft .NET™ languages such as C #, and/or the like. Computing logic may be compiled into executable programs or written in interpreted programming languages. Generally, functionality described herein can be implemented as logic modules that can be duplicated to provide greater processing capability, merged with other modules, or divided into sub modules. The computing logic can be stored in any type of computer readable medium (e.g., a non-transitory medium such as a memory or storage medium) or computer storage device and be stored on and executed by one or more general purpose or special purpose processors, thus creating a special purpose computing device configured to provide functionality described herein.

IV. EXTENSIONS AND ALTERNATIVES

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. While illustrative embodiments of the invention have been illustrated and described, it will be appreciated that various changes can be made therein without departing from the spirit and scope of the invention.

The embodiment of the invention in which an exclusive property or privilege is claimed are defined as follows:

1. A computer-implemented method executed by a local computing device communicatively coupled to one or more signature devices, the method comprising:

executing an arbitrator service that manages a plurality of mappings between a plurality of web browser processes and a plurality of port numbers associated with a plurality of signature device control instances;

launching a first signature device control instance including a first local web server, wherein the first signature device control instance:

controls a first signature device and receives signature data from the first signature device, and listens to a first port corresponding to a first uniform resource locator (URL);

retrieving, by a first web browser process executing on the local computing device, a web page from a remote server with a second URL, wherein the web page includes:

a document indicating a context for a signature to be input by the first signature device, and a cross-domain reference indicating the first URL;

obtaining, by the first web browser process, the port number of the first port from the arbitrator service;

establishing, by the first web browser process, a connection with the first port using the port number obtained from the arbitrator service;

controlling, by the first web browser process, the first signature device; and receiving, by the first web browser process, signature data from the first signature device.

2. The method of claim 1, wherein the arbitrator service is executed before any signature device control instances are launched.

3. The method of claim 2, further comprising:

launching a second signature device control instance including a second local web server, wherein the second signature device control instance:

controls the first signature device or another signature device, and listens to a second port corresponding to the first URL;

retrieving, by a second web browser process executing on the local computing device, the web page from the remote server;

obtaining, by the second web browser process, the port number of the second port from the arbitrator service; and establishing, by the second web browser process, a connection with the second port using the port number obtained from the arbitrator service.

4. The method of claim 1, wherein the arbitrator service manages the mappings by:

obtaining the process ID (PID) of the first web browser process;

obtaining a user ID (UID) associated with the PID; and obtaining the port number of the first port for the UID.

5. The method of claim 4, wherein the arbitrator service maintains the UID and port number, wherein the port number of the first port is assigned by the arbitrator service, and wherein the obtaining the port number of the first port comprises looking up the port number in a table of assigned port numbers and UIDs.

6. A computer-implemented method executed by a local computing device communicatively coupled to one or more signature devices, the method comprising:

executing a proxy service that starts a local web server that listens to a first port corresponding to a first uniform resource locator (URL), and manages a plurality of mappings between a plurality of web browser processes and a plurality of signature device control instances;

launching a first signature device control instance that controls a first signature device and receives signature data from the first signature device;

retrieving, by a first web browser process executing on the local computing device, a web page from a remote server with a second URL, wherein the web page includes:

a document indicating a context for a signature to be input by the first signature device, and a cross-domain reference indicating the first URL;

sending, by the first web browser process, a signature device control call to the first port listened to by the proxy service;

by the proxy service, sending the call to the first signature device control instance and receiving a call response using Inter-Process Communications (IPC);

sending, by the proxy service, the call response to the first web browser process;

controlling, by the first web browser process, the first signature device; and receiving, by the first web browser process, signature data from the first signature device.

7. The method of claim 6, wherein the proxy service is executed before any signature device control instances are launched.

8. The method of claim 7, further comprising:

launching a second signature device control instance that controls the first signature device or another signature device, retrieving, by a second web browser process executing on the local computing device, the web page from the remote server;

sending, by the second web browser process, a signature device control call to the first port listened to by the proxy service;

by the proxy service, sending the call to the second signature device control instance and receiving a call response using Inter-Process Communications (IPC); and sending, by the proxy service, the call response to the second web browser process.

9. The method of claim 6, wherein the proxy service manages the mappings by:

obtaining the process ID (PID) of the first web browser process;

obtaining a user ID (UID) associated with the PID; and obtaining information for using IPC with the first signature device control instance for the UID.

* * * * *